No. 717,733. PATENTED JAN. 6, 1903.
J. M. BREWER.
CULTIVATOR ATTACHMENT.
APPLICATION FILED JUNE 13, 1902.
NO MODEL.
FIG. 1.
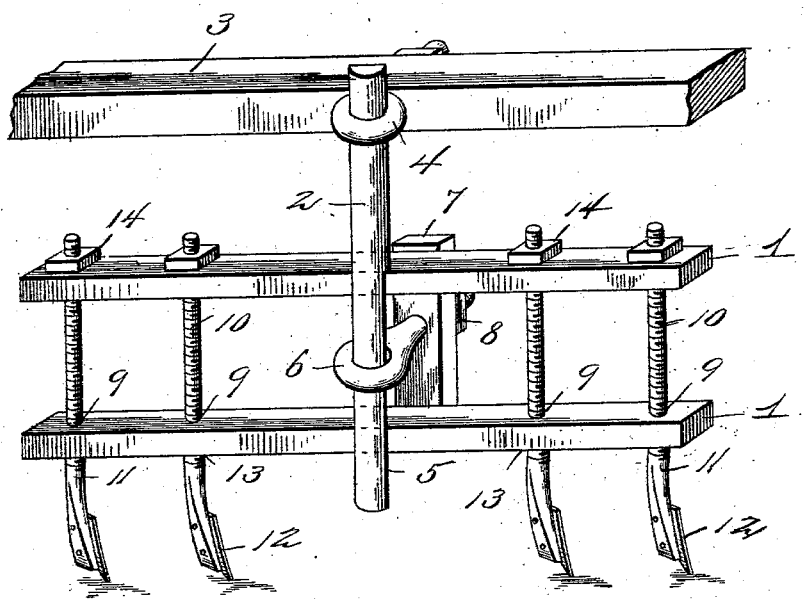
FIG. 2. FIG. 3.
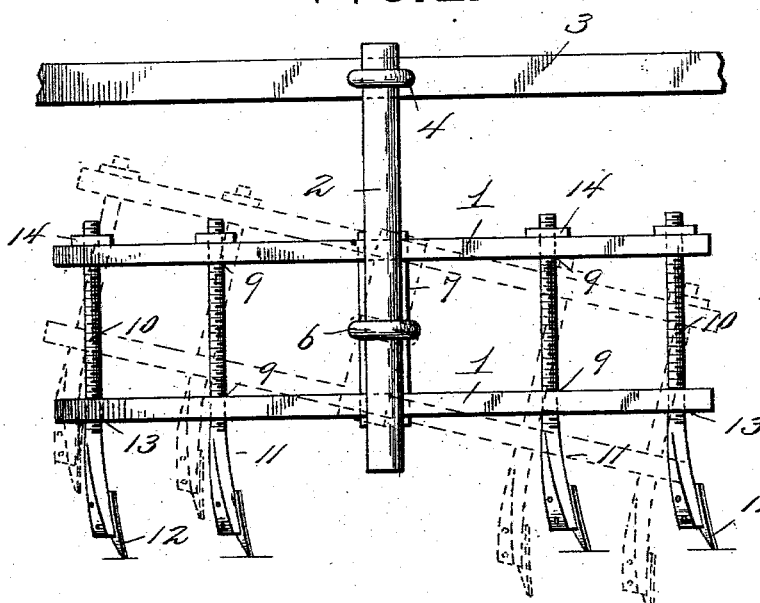 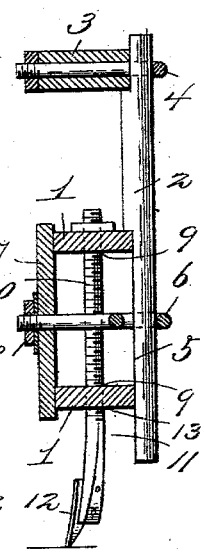
Witnesses
Harry L. Amer.
N. Reynolds.
Inventor
J. M. Brewer.
By Rexford M. Smith.
Attorney

UNITED STATES PATENT OFFICE.

JOHN MEED BREWER, OF CLEBURNE, TEXAS.

CULTIVATOR ATTACHMENT.

SPECIFICATION forming part of Letters Patent No. 717,733, dated January 6, 1903.

Application filed June 13, 1902. Serial No. 111,481. (No model.)

*To all whom it may concern:*

Be it known that I, JOHN MEED BREWER, a citizen of the United States, residing at Cleburne, in the county of Johnson and State of Texas, have invented a certain new and useful Cultivator Attachment, of which the following is a specification, reference being had therein to the accompanying drawings.

This invention relates to attachments for cultivators and plows, the object being to provide an attachment in the nature of a harrow or fine cultivator for thoroughly breaking up the soil at opposite sides of the plants and leveling the ground between the rows.

The frame of the attachment, to which teeth or shovels are applied, is so constructed and mounted that it is capable of a number of adjustments which permit the line of teeth or shovels to be presented at any desired angle to the vertical or horizontal, enabling the teeth to work on a level or inclined surface and at any desired angle to the line of draft. The frame is also adjustable up or down for the purpose of varying the depth of penetration of the teeth or shovels. The attachment is also applicable to any plow or cultivator of the type at present in use.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a perspective view of a complete attachment constructed in accordance with the present invention and shown applied to the beam of a cultivator or plow. Fig. 2 is a view in elevation of the same. Fig. 3 is a vertical cross-section taken in line with the standard or upright.

Like reference-numerals designate corresponding parts in all the figures of the drawings.

The frame of the attachment contemplated in this invention consists, essentially, of a pair of parallel bars 1, arranged at a suitable distance apart one above the other and connected intermediate their ends by means of a standard or foot-piece 2, which is designed to take the place of the ordinary foot or standard found on the cultivator at present in use, the beam or frame-piece 3 of the cultivator being provided with an eyebolt 4, which receives the upper end of the standard 2 and connects the same rigidly with the cultivator. At one side the standard 2 is cut away or recessed, as shown at 5, to form a flat surface which bears against the corresponding edges of the parallel bars 1, as shown in Figs. 1 and 3. Between the bars 1 an eyebolt 6 receives the standard 2, said eyebolt passing between the parallel bars 1 and through a clamping-bar 7, which extends vertically across the parallel bars 1 and is threaded to receive a clamping-nut 8. By the means just described the parallel bars 1 are securely clamped against the flat side of the standard 2, and it may be here stated that by loosening the nut 8 the bars may be tilted to any desired angle with relation to the standard 2 for enabling the machine to work upon a side hill or inclined surface as well as on level ground. The attachment may also be adjusted up or down to regulate the depth of penetration by means of the eyebolt 4 or by moving the bars up or down on the standard 2.

The bars 1 are provided with threaded openings 9. These openings are arranged in vertical alinement with each other, so as to receive the threaded shanks 10 of a series of posts 11, provided at their lower ends with teeth or shovels 12. The said shanks are held at their upper ends by means of lock-nuts 14, threaded upon the upper extremities of the shanks, as clearly illustrated in the drawings.

By the means just described the parallel bars 1 are braced relatively to each other and adjustable toward and away from each other, the bars 1 and shanks 10 constituting the frame of the attachment.

From the foregoing description it will be understood that the teeth or shovels may be raised or lowered and the frame as a whole tilted and also swung horizontally, so as to enable the attachment to work on a side hill and also to regulate the angle of presentation of the teeth or shovels with respect to the line of draft of the machine.

The attachment may be made in various sizes to suit the different cultivators or plows and may be provided with any desired number of teeth or shovels and will be found very useful in cultivating plants, such as cotton, corn, beans, &c.

Having thus described the invention, what is claimed as new, and desired to be secured by Letters Patent, is—

1. The herein-described attachment comprising parallel bars spaced apart, teeth or shovels having their shanks extended through openings in the bars and secured therein, a foot-piece or standard arranged at one side of the bars, a clamping-bar arranged opposite the standard, and an eyebolt embracing the standard and passing through the clamping-bar, substantially as described.

2. The herein-described attachment, comprising parallel bars, having openings in line with each other, teeth or shovels having threaded shanks passing through said openings, means for fastening the shanks in place, a standard having a flattened portion bearing against said bars at one side, a clamping-bar bearing against the opposite sides of said bars, and an eyebolt embracing the standard and passing through the clamping-bar, substantially as and for the purpose specified.

3. The herein-described attachment, comprising parallel bars spaced apart and provided with threaded openings in alinement with each other, teeth or shovels having threaded shanks passing through said openings, lock-nuts upon said shanks bearing against one of the bars and a standard connected with said bars and provided with a clamping device for securing the same to the frame of a cultivator, substantially as described.

In testimony whereof I affix my signature in presence of two witnesses.

JOHN MEED BREWER.

Witnesses:
   C. L. CLEVELAND,
   R. H. DENING.